(12) United States Patent
Wang

(10) Patent No.: US 7,050,628 B2
(45) Date of Patent: May 23, 2006

(54) METHOD FOR DIFFERENTIATING DYNAMIC RANGE OF IMAGE

(76) Inventor: Kuo-Jeng Wang, 14, Kung-An St., Hsiao-Kang, Kaohsiung City (TW)

( * ) Notice: Subject to any disclaimer, the term of this patent is extended or adjusted under 35 U.S.C. 154(b) by 657 days.

(21) Appl. No.: 10/281,307

(22) Filed: Oct. 28, 2002

(65) Prior Publication Data
US 2004/0081358 A1   Apr. 29, 2004

(51) Int. Cl.
*G06K 9/00* (2006.01)
(52) U.S. Cl. .................................. 382/170; 382/172
(58) Field of Classification Search ............... 382/168, 382/170, 172, 286
See application file for complete search history.

(56) References Cited

U.S. PATENT DOCUMENTS 6,061,091 A * 5/2000 Van de Poel et al. ....... 382/170

* cited by examiner

*Primary Examiner*—Phuoc Tran
(74) *Attorney, Agent, or Firm*—Berkeley Law & Technology Group

(57) ABSTRACT

A method for differentiating dynamic range of image is disclosed. The method comprises the following steps. First of all, pixel numbers with the same level value of Density units $D_{n-1}$ and $D_n$ are compared. Next the minimum pixel numbers of each level value of Density units $D_{n-1}$ and $D_n$ are counted. Then the minimum pixel numbers of each level value of Density units $D_{n-1}$ and $D_n$ are summed. Next the ratio of total minimum pixel number and total pixel number R and a specification value $R_s$ are compared. Then whether R is smaller than $R_s$ or not is determined so as to recognize whether Density units $D_{n-1}$ and $D_n$ could be differentiated or not.

6 Claims, 2 Drawing Sheets

METHOD FOR DIFFERENTIATING DYNAMIC RANGE OF IMAGE

BACKGROUND OF THE INVENTION

1. Field of the Invention

The present invention relates to a method for differentiating dynamic range of image, and more particularly to method for differentiating density units in a dynamic range of image.

2. Description of the Related Art

Optical scanners are used to capture and digitize images. For example, an optical scanner can be used to capture the image of printed matter, on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC), a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

Images of a target or a test chart finally generated by a scanner have density units with separate pixel-level distribution. Although density units have individual pixel-level distribution, the pixel-level distributions of density units could overlap so as to render the density units undistinguishable. Conventionally, density units $D_n$ and $D_{n+1}$ are differentiated by a standard deviation method, wherein when $D_n - 1/4 S_n > D_{n+1} + 1/4 S_{n+1}$, density units $D_n$ and $D_{n+1}$ are distinguishable. However, the standard deviation method still has several disadvantages. For example, when some obstacles or dusts are present on a target or a test chart, the images of the obstacles or dusts would interfere the differentiation of density units by the standard deviation method.

Hence it is desirable to provide a method for differentiating dynamic range of image to overcome the disadvantages of the conventional method.

SUMMARY OF THE INVENTION

It is therefore an object of the invention to provide a method for differentiating dynamic range of image to exclude the interference of the differentiation of density units induced by obstacles on images.

To achieve these objects, and in accordance with the purpose of the invention, the invention provide a method for differentiating dynamic range of image. The method comprises the following steps. First of all, pixel numbers with the same level value of Density units $D_{n-1}$ and $D_n$ are compared. Next the minimum pixel numbers of each level value of Density units $D_{n-1}$ and $D_n$ are counted. Then the minimum pixel numbers of each level value of Density units $D_{n-1}$ and $D_n$ are summed. Next the ratio of total minimum pixel number and total pixel number R and a specification value $R_s$ are compared. Then whether R is smaller than $R_s$ or not is determined so as to recognize whether Density units $D_{n-1}$ and $D_n$ could be differentiated or not. When the ratio R is smaller than the specification value $R_s$, the density units $D_{n-1}$ and $D_n$ are determined as distinguishable. When the ratio R is not smaller than the specification value $R_s$, the density units $D_{n-1}$ and $D_n$ are determined as undistinguishable.

Dynamic range of image can also be differentiated by using an overlap area of pixel-level distributions of density units. Firstly, pixel-level distributions of density units $D_{n-1}$ and $D_n$ are provided. Then an overlap area of the pixel-level distributions of the density units $D_{n-1}$ and $D_n$ is counted and the overlap area is compared with a specification value. When the overlap area is smaller than the specification value, the density units $D_{n-1}$ and $D_n$ are determined as distinguishable. Instead, when the overlap area is not smaller than the specification value, the density units $D_{n-1}$ and $D_n$ are determined as undistinguishable.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method for differentiating dynamic range of image described below do not cover a complete system and method. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
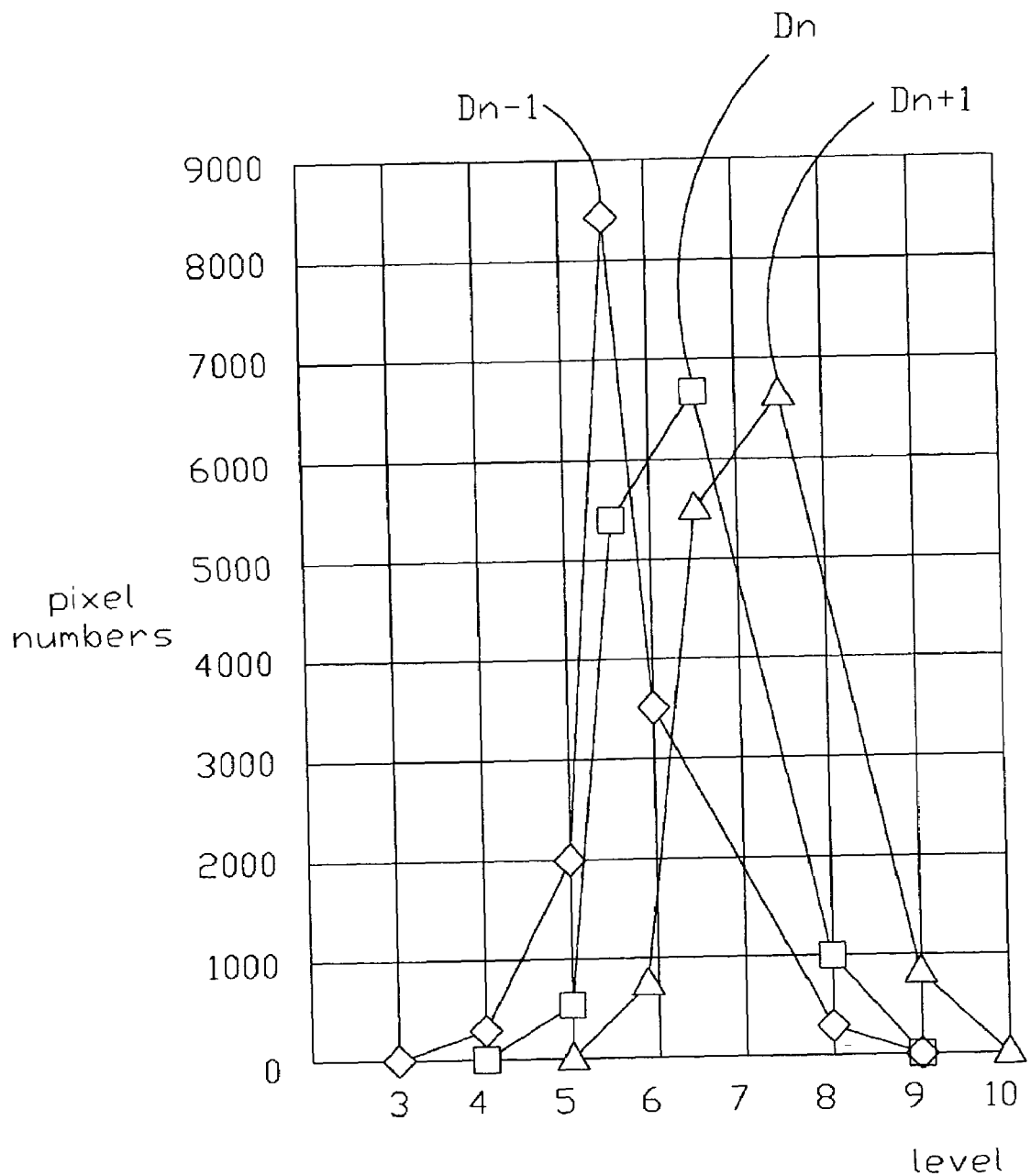
FIG. 1 shows a diagram of pixel number versus levels of an image of a target or a test chart.

Referring to FIG. 1, a diagram of pixel number versus levels of an image of a target or a test chart is shown. Density units $D_{n-1}$, $D_n$ and $D_{n+1}$ separately have pixel-level distributions overlapped. Density unit $D_{n-1}$ has a pixel-level distribution which has one pixel with a minimum level value 3, over 8000 pixels with level 6 and 186 pixels with a maximum level value of 8. Most pixels of density unit $D_{n-1}$ have level values from 4 to 8. Density unit $D_n$ has a pixel-level distribution which has 21 pixels with a minimum level of 4, over 6500 pixels with a level of 7 and 15 pixels with a maximum level value of 9. Most pixels of density unit $D_n$ have level values from 5 to 8. Density unit $D_{n+1}$ has a pixel-level distribution which has 1 pixels with a minimum level of 4, over 6500 pixels with a level of 8 and 15 pixels with a maximum level value of 10. Most pixels of density unit $D_{n+1}$ have level values from 6 to 9. Since the pixel-level distributions of Density units $D_{n-1}$, $D_n$ and $D_{n+1}$ overlaps with each other, whether Density units $D_{n-1}$, $D_n$ and $D_{n+1}$ can be differentiated depends on the overlap areas of pixel-level distributions of Density units $D_{n-1}$, $D_n$ and $D_{n+1}$. The larger areas of pixel-level distributions Density units overlap, the harder Density units can be differentiated. By comparing and counting the total pixel number with the same level value of Density units, Density units can be determined as distinguishable or undistinguishable. By setting a critical value of overlap area of pixel-level distributions of Density units, an image of a target or a test chart can be recognized as distinguishable or undistinguishable.

Table 1 further illustrates the pixel-level distributions of Density units $D_{n-1}$, $D_n$ and $D_{n+1}$ and the comparison and counting of the overlap area of Density units $D_{n-1}$, $D_n$ and $D_{n+1}$. By comparing and counting the pixels with the same level value of two adjacent Density units, total pixels with the same level value which would render the two adjacent Density units undistinguishable can be obtained. As shown in Table 1, by counting and summing the minimum pixel number of two adjacent Density units, the total pixel number of the overlap area between two adjacent Density units can be obtained. In Table 1, if a critical value of total pixel number of the overlap area of Density units above which Density units are determined as undistinguishable is set as 7500, Density units $D_{n-1}$ and $D_n$ are undistinguishable while Density units $D_n$ and $D_{n+1}$ are distinguishable. The critical value can also be a ratio of the pixel number of the overlap area and total pixel number. For example, the critical value can be 7500/13926 or 0.5386. The overlap ratio between Density units $D_{n-1}$ and $D_n$ is 9700/13926 or 0.6966 and Density units $D_{n-1}$ and $D_n$ are undistinguishable. The overlap ratio between Density units $D_n$ and $D_{n+1}$ is 7407/13926 or 0.5319 and Density units $D_n$ and $D_{n+1}$ are distinguishable.

TABLE 1

| Level | $D_{n-1}$ Pixels | $D_n$ Pixels | $D_{n+1}$ Pixels | Min ($D_{n-1}$:$D_n$) | Min ($D_n$:$D_{n+1}$) |
|---|---|---|---|---|---|
| 3 | 1 | 0 | 0 | 0 | 0 |
| 4 | 219 | 21 | 1 | 21 | 1 |
| 5 | 1965 | 454 | 8 | 454 | 8 |
| 6 | 8134 | 5618 | 639 | 5618 | 639 |
| 7 | 3421 | 6784 | 5710 | 3421 | 5710 |
| 8 | 186 | 1034 | 6655 | 186 | 1034 |
| 9 | 0 | 15 | 910 | 0 | 15 |
| 10 | 0 | 0 | 3 | 0 | 0 |
| Total | 13926 | 13926 | 13926 | 9700 | 7407 |

Figure 2:
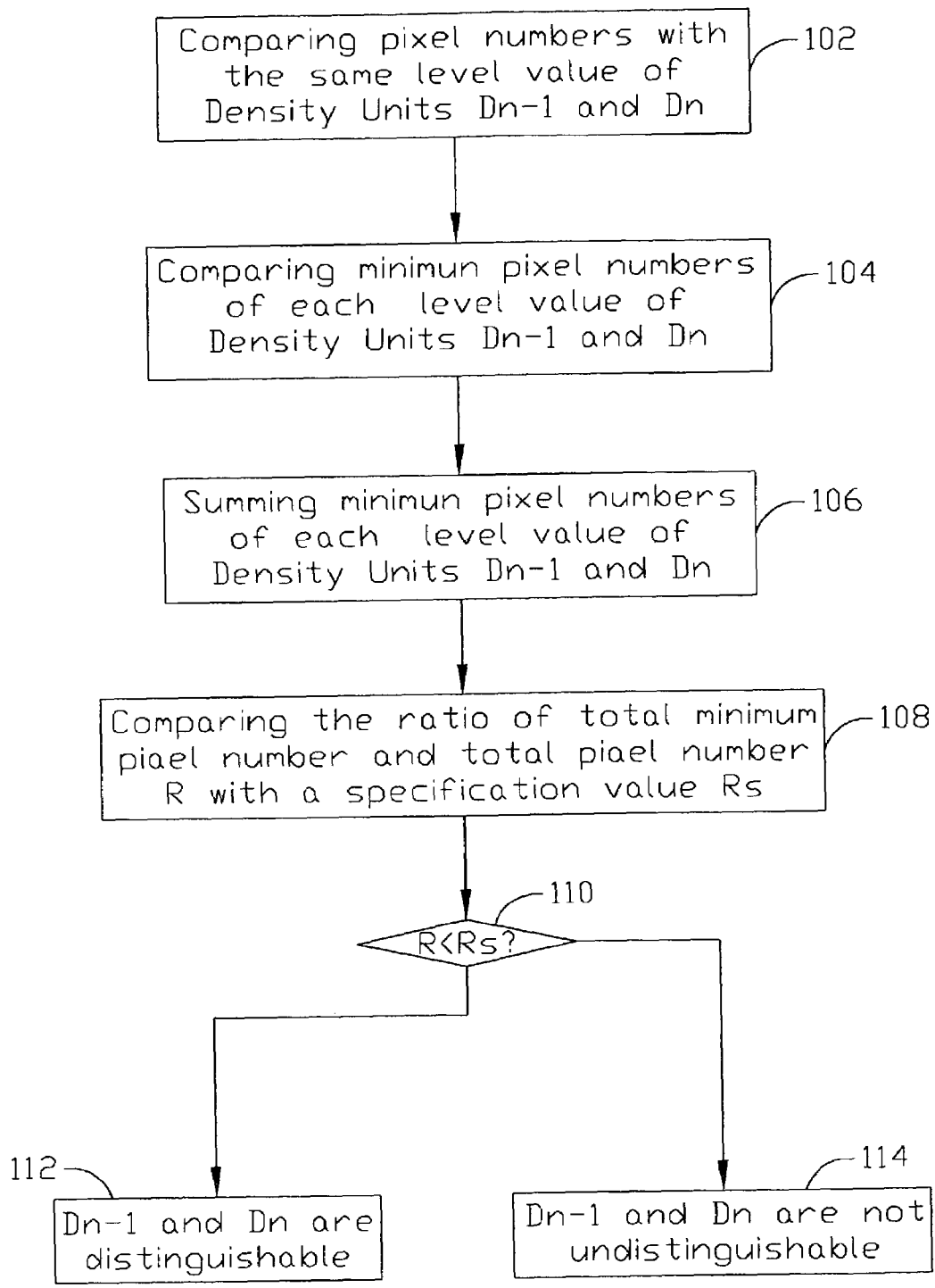
FIG. 2 shows a flow chart of the invention.

Referring to FIG. 2, a flow chart of the invention is shown. Density units of an image can be differentiated by the following steps. First of all, pixel numbers with the same level value of Density units $D_{n-1}$ and $D_n$ are compared in step 102. Next the minimum pixel numbers of each level value of Density units $D_{n-1}$ and $D_n$ are counted in step 104. Then the minimum pixel numbers of each level value of Density units $D_{n-1}$ and $D_n$ are summed in step 106. Next the ratio of total minimum pixel number and total pixel number R and a specification value $R_s$ are compared in step 108. Then whether R is smaller than $R_s$ or not is determined in step 110. If R is smaller than $R_s$, then Density units $D_{n-1}$ and $D_n$ are determined as distinguishable in step 112. If R is not smaller than $R_s$, then Density units $D_{n-1}$ and $D_n$ are determined as undistinguishable in step 114.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claim is:

1. A method for differentiating dynamic range of image, said method comprising:

comparing pixel numbers with a same level value of density units $D_{n-1}$ and $D_n$;

counting a minimum pixel number of each level value of density units $D_{n-1}$ and $D_n$;

summing said minimum pixel number of each level value of density units $D_{n-1}$ and $D_n$; and comparing a ratio of total minimum pixel number and total pixel number R with a specification value $R_s$.

2. The method according to claim 1, when said ratio R is smaller than said specification value $R_s$, said density units $D_{n-1}$ and $D_n$ are determined as distinguishable.

3. The method according to claim 1, when said ratio R is not smaller than said specification value $R_s$, said density units $D_{n-1}$ and $D_n$ are determined as undistinguishable.

4. A method for differentiating dynamic range of image, said method comprising:

providing pixel-level distributions of density units $D_{n-1}$ and $D_n$;

counting a overlap area of said pixel-level distributions of said density units $D_{n-1}$ and $D_n$; and comparing said overlap area with a specification value.

5. The method according to claim 4, when said overlap area is smaller than said specification value, said density units $D_{n-1}$ and $D_n$ are determined as distinguishable.

6. The method according to claim 4, when said overlap area is not smaller than said specification value, said density units $D_{n-1}$ and $D_n$ are determined as undistinguishable.

* * * * *